(12) United States Patent
Imanse et al.

(10) Patent No.: US 7,093,721 B2
(45) Date of Patent: Aug. 22, 2006

(54) FILTER ASSEMBLY WITH SEALED, MAGNETICALLY COUPLED CLEANING HEAD ACTUATOR

(75) Inventors: Craig Lee Imanse, Schoolcraft, MI (US); Samuel Clay Sayles, Kalamazoo, MI (US)

(73) Assignee: Delaware Corporation Formation, Inc., Wilmington, DE (US)

( * ) Notice: Subject to any disclaimer, the term of this patent is extended or adjusted under 35 U.S.C. 154(b) by 369 days.

(21) Appl. No.: 10/654,013

(22) Filed: Sep. 3, 2003

(65) Prior Publication Data

US 2005/0045537 A1    Mar. 3, 2005

(51) Int. Cl.
*B01D 29/64* (2006.01)

(52) U.S. Cl. .................. 210/413; 55/296; 210/415; 210/497.01

(58) Field of Classification Search ................ 210/106, 210/141, 396, 408, 411–415, 497.01, 498; 55/282, 295–298; 209/273, 287
See application file for complete search history.

(56) References Cited

U.S. PATENT DOCUMENTS

| | | | |
|---|---|---|---|
| 5,087,365 A * | 2/1992 | Davis et al. ................ | 210/415 |
| 5,137,856 A * | 8/1992 | Koskinen et al. ........... | 502/107 |
| 5,166,110 A * | 11/1992 | Brun .......................... | 502/62 |
| 5,198,111 A | 3/1993 | Davis | |
| 5,525,701 A * | 6/1996 | Tominari et al. ........... | 528/199 |
| 5,527,462 A | 6/1996 | Davis et al. | |
| 5,545,829 A * | 8/1996 | Brekner et al. ............. | 526/160 |
| 5,569,383 A | 10/1996 | Vander Ark, Jr. et al. | |
| 5,804,072 A * | 9/1998 | Yang .......................... | 210/411 |

FOREIGN PATENT DOCUMENTS

| | | |
|---|---|---|
| CA | 2 363 588 A1 | 5/2003 |
| EP | 0 473 975 A2 | 3/1992 |

OTHER PUBLICATIONS

PCT Notification of Transmittal of International Search Report and Written Opinion of the International Searching Authority, or the Declaration (PCT/ISA/220) (2 pages).
International Search Report dated Mar. 1, 2005 (6 pages).
PCT Written Opinion of the International Searching Authority (PCT/ISA/237) (12 pages).

\* cited by examiner

*Primary Examiner*—Joseph Drodge
(74) *Attorney, Agent, or Firm*—Flynn, Thiel, Boutell & Tanis, P.C.

(57) ABSTRACT

A filter assembly for removing filtrate from industrial process streams. The assembly includes a housing in which a filter element is disposed. The filter element has a surface against which the filtrate is trapped. A cleaning head to which cleaning blades are attached is disposed in the housing and removes the trapped filtrate. An actuator tube extends through the housing. Internal to the actuator tube is a first magnet. Pressurized gas is selectively applied to the ends of the actuator tube to move the first magnet in the tube. A second magnet is attached to the cleaning head. The second magnet is magnetically coupled to the first magnet so the second magnet moves with the first magnet. Thus, the movement of the first magnet is transferred by the second magnet to the clean head so the cleaning blades move against the filter element.

26 Claims, 13 Drawing Sheets

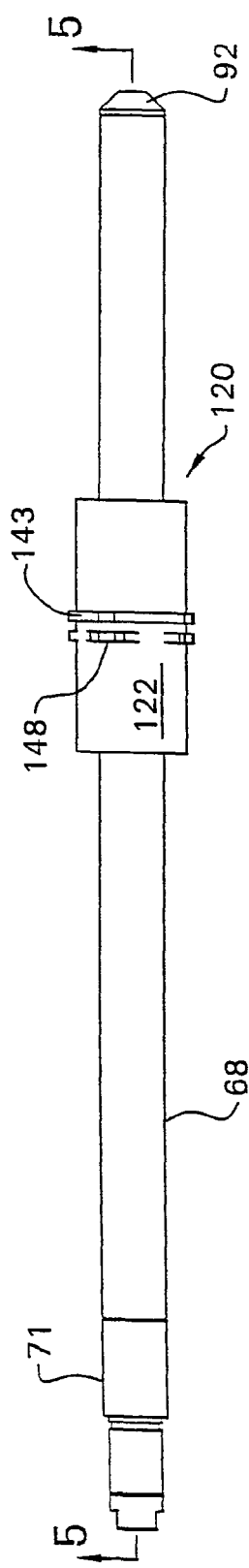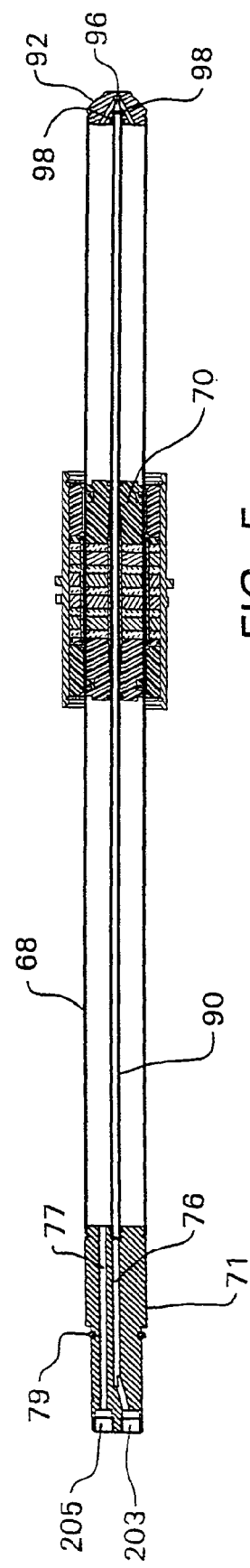
FIG. 4
FIG. 5

FILTER ASSEMBLY WITH SEALED, MAGNETICALLY COUPLED CLEANING HEAD ACTUATOR

FIELD OF THIS INVENTION

This invention relates generally to a filter assembly for processing a liquid-state industrial process stream and, more particularly, to a filter assembly with a cleaning head with an actuator that is sealed and magnetically coupled to the cleaning head.

BACKGROUND OF THE INVENTION

Filter assemblies are used in industrial facilitates to selectively remove material from process streams. Filter assemblies are used to both remove undesirable contaminates from process streams and to extract desirable materials (both hereafter termed filtrates) out of the process streams. Two such filter assemblies are disclosed in the Applicants' Assignees' U.S. Pat. No. 5,198,111, FILTER WITH RECIPROCATING CLEANING UNIT, issued Mar. 30, 1993 and U.S. Pat. No. 5,527,462, FILTER WITH AXIALLY MOVABLE WIPER, issued Jun. 18, 1996, both of which are incorporated herein by reference.

Generally, each of the above-referenced filter assemblies includes an elongated, cylindrically shaped housing. Internal to the housing there is a sleeve shaped filter element. The process stream to be filtered is introduced into the center of the filter element, usually through the top of the housing. The process stream is filtered as it passes from the inside to the outside of the filter member. The filtered process stream exits the filter assembly through an opening in the housing.

As the process stream passes through a filter assembly, the removed filtrate builds up on the inner wall of the filter element. If allowed to remain in place, the filtrate will, over time, first impede and then possibly block fluid flow through the filter assembly. Therefore, it is a common practice to further provide the filter assembly with a cleaning head. This cleaning head moves longitudinally up and down through the filter element to scrape off the filtrate that adheres to the element. Typically, the removed filtrate is allowed to flow through the bottom of the filter element and out through an opening in the bottom of the housing.

U.S. Pat. No. 5,198,111 discloses a filter assembly wherein the cleaning head is mounted to a threaded shaft that extends longitudinally axially through the housing and filter element. A motor mounted to the housing rotates the shaft so as to cause the longitudinal displacement of the cleaning head. U.S. Pat. No. 5,527,462 discloses a filter assembly wherein the cleaning head is mounted to the end of a piston rod that extends down from the top of the housing into the filter element. The opposed end of the piston rod is disposed in a cylinder attached to the top of the housing. A fluid, such as compressed air, is applied to the cylinder in order to cause the extension/retraction of the piston rod and cleaning head through the filter element.

One disadvantage associated with providing a filter assembly with a screw type cleaning head actuator is that the actuator has components that come into contact with the process stream. Steps must be taken to ensure that the upline components that drive the moving components are not exposed to the process stream. For example, it is necessary to ensure that there is a liquid-tight seal around the opening through which the screw shaft enters the housing. A similar seal must be provided around the opening where the piston of the above-described linear actuator enters the housing. It should be understood that fluid typically enters the housing under a significant amount of pressure, for example 150 psi. In order to successfully perform the filter process, it may be necessary to repetitively actuate the cleaning head. Therefore, given that the seal around the actuator is subjected to significant pressure and the actuator itself is repeatedly actuated, this seal is subjected to significant wear. This wear requires that an appreciable amount of effort be spent verifying that the seal is maintaining its integrity, and when that integrity shows signs of failing, replacing the seal.

SUMMARY OF THE INVENTION

This invention is related to a new and useful filter assembly for filtering industrial liquid-state process streams. The filter assembly of this invention includes a cleaning head with a sealed actuator. Specifically, the actuator includes an actuator tube disposed in the assembly housing. A piston formed of magnets, is disposed is the actuator tube. The cleaning head is disposed over the actuator tube. Magnets associated with the cleaning head couple the head to the piston even though the actuator tube separates the two components.

The cleaning head of the filter assembly of this invention is displaced up and down in the filter housing by selectively supplying a pressurized gas or liquid to the opposed ends of the actuator tube. In some versions of the invention, pressurized air is employed. The air causes the piston to move longitudinally through the actuator tube. Since the cleaning head is magnetically coupled to the piston, the longitudinal movement of the piston causes the like displacement of the cleaning head.

The filter assembly of this invention is constructed so that only the cleaning head and the complementary magnet carrier to which it is attached are the moving components exposed to the process stream. The actuator tube seals the components that force the movement of the cleaning head, the piston. Thus, this invention does not require one to provide some sort of liquid tight seal between a moving member that extends into the filter housing and a housing opening through which the member extends. The elimination of this seal, and the need to maintain it, minimize the overall costs associated with operating the filter assembly of this invention.

BRIEF DESCRIPTION OF THE DRAWINGS

The invention is pointed out with particularity in the claims. The above and further features and benefits of the invention may be better understood by reference to the following description in combination with the accompanying drawings, in which:

FIG. 4 is a plan view of the actuator tube and carrier subassembly of this invention;

FIG. 5 is a cross-sectional view of the actuator tube and carrier subassembly taken along line 5—5 of FIG. 4;

DETAILED DESCRIPTION

Figure 1:
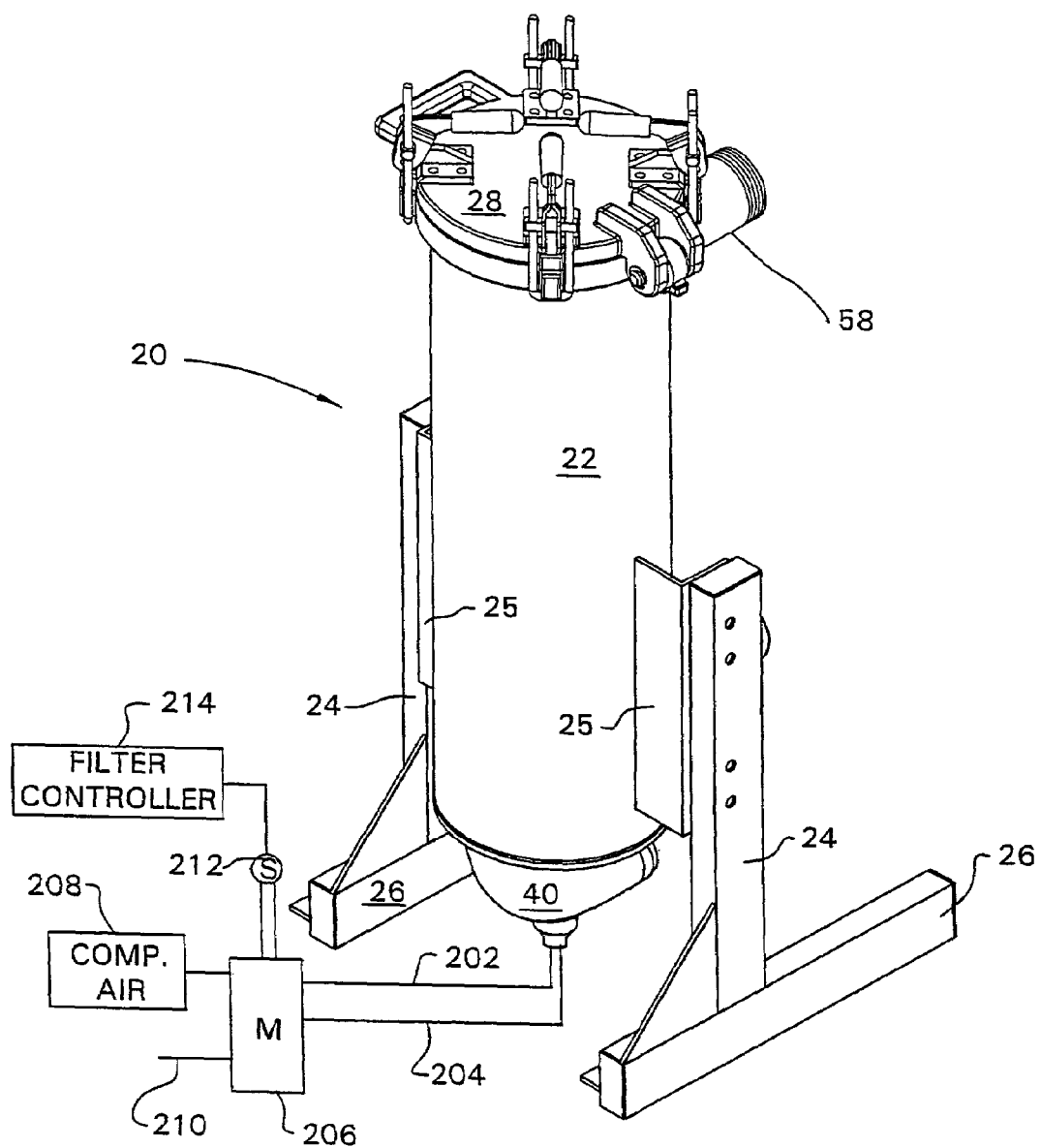
FIG. 1 is a perspective view of the filter assembly of this invention.
Figure 2:
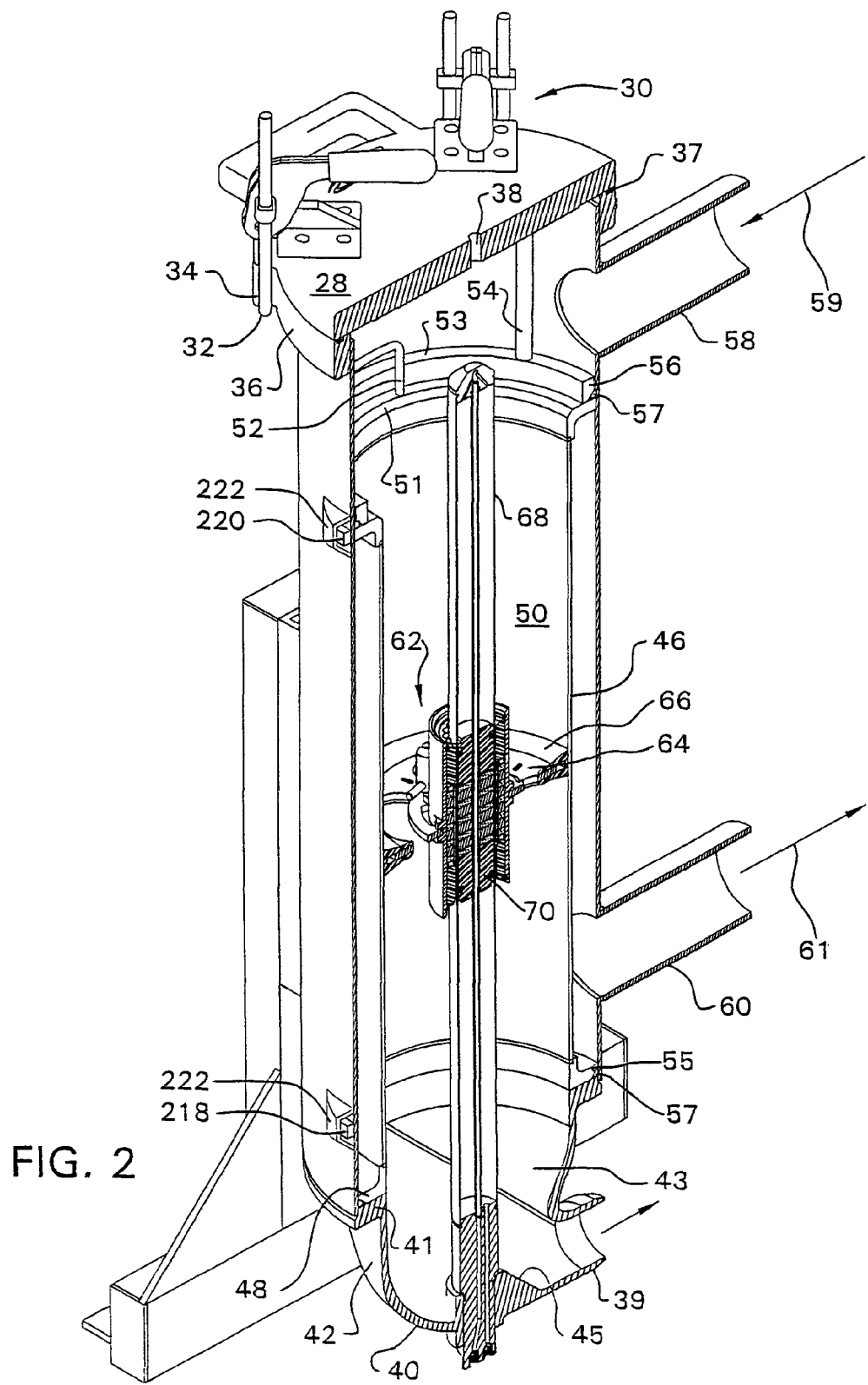
FIG. 2 is a cross-sectional view of the basic components of the filter assembly of this invention.

FIGS. 1 and 2 illustrate the basic features of the filter assembly 20 of this invention. The filter assembly 20 includes a generally cylindrical housing 22. A pair of opposed legs 24 hold the housing 22 above ground level. Tabs 25 that extend from opposed sides of housing 22 connect the housing to the legs 24. A pair of feet 26, one foot 26 being attached to the end of each leg 24, stabilizes the housing 22 and the other components of the filter assembly 20 integral with the housing.

The top end of the housing 22 is open. A lid 28 that is hingedly attached to housing 22 selectively covers the top opening. A set of locking clamps 30 releasably hold the lid 28 over the open end of the housing 22. Each clamp 30 has a U-bolt 32 that engages over a separate tab 34 integral with a lip 36 that extends around the opening end of the housing 22. The engagement of the U-bolts 32 over the tabs 34 is what holds the lid 28 over the housing 22. One source of clamps 30 is the Model 374 manufactured by De-Sta-Co Industries of Birmingham, Mich.

An O-ring 37 disposed in a groove in the upper exposed face of lip 36 provides a liquid-tight seal between the interface of housing 22 and lid 28 (groove not identified). A small bore 38 extends through the center axis of lid 28. Bore 38 functions as a vent.

Figure 3:
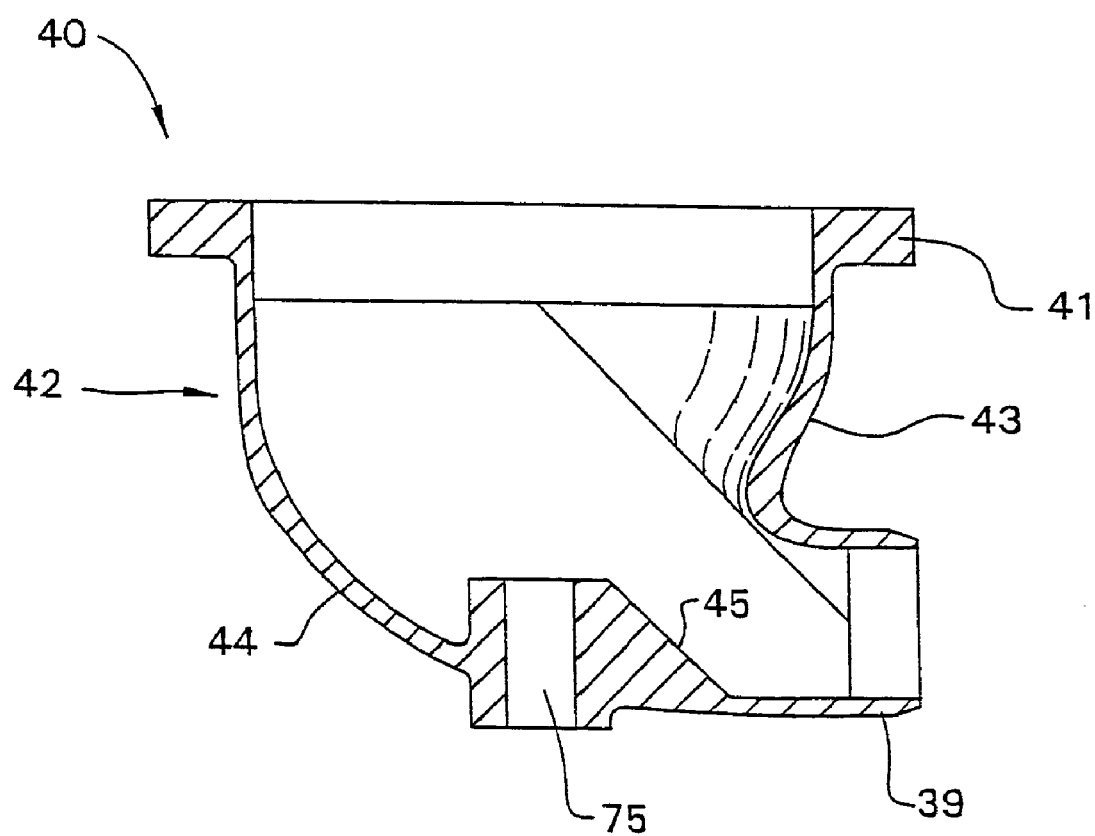
FIG. 3 is a cross-sectional view of the bottom cone.

The bottom end of housing 22 is also open. A bottom cone 40 is welded or otherwise permanently secured to the bottom end of housing 22. As seen by reference to FIGS. 2 and 3, it is noted that bottom cone 40 is formed with a lip 41 that is disposed within the bottom end of housing 22. Bottom cone 40 is further formed to have a tubularly shaped outlet fitting 39 that extends laterally away from the base or bottom end of the cone.

Bottom cone 40 is further shaped so that the section of the cone immediately below lip 41 and opposite the side of the cone from which fitting 39 extends downwardly from the inner perimeter of lip 41, cone section 42, has a constant diameter. The section of the cone 40 immediately below lip 41 and above fitting 39, cone section 43, curves inwardly and downwardly from lip 41. The end section of the bottom cone 40, cone end section 44, is semispherical in shape. The cone end section 44 is the portion of the bottom cone 40 from which the outlet fitting 39 extends.

A tear-drop shaped boss 45 extends upwardly from the inner wall of the cone end section 44. Boss 45 is positioned so that the wide diameter section of the boss is centered on the longitudinal axis of the housing 22 and bottom cone 40. The narrow diameter pointed end of boss 45 is directed towards, and is in line with, the longitudinal axis of the outlet fitting 39.

A filter element 46 is disposed in the enclosed space defined by housing 22, lid 28 and bottom cone 40. The filter element includes a base ring 48 with an L-shaped cross-sectional profile from which a filter member 50 extends. While not specifically illustrated, one particular filter member 50 includes a number of longitudinally extending metal ribs that are spaced a small distance apart from each other. The ribs extend circumferentially around the base member. Spaced apart metal annular ribs extend around the outer surface of the longitudinally extending ribs. The interstitial gaps between the ribs of the filter member 50 are the pores through which the process liquid flows.

A top ring 51, similar in shape to bottom ring 48, extends around the top of the filter member 50. U-shaped handles 52, one partially shown, extend upwardly from top ring 51. Handles 52 facilitate the installation and removal of the filter element 46 from housing 22.

When the filter element 46 is seated in housing 22, the bottom surface of the base ring 48 seats against the adjacent lip 41 of bottom cone 40. A compressor assembly is seated over the filter element top ring 51. The compressor assembly consists of a retainer ring 53 to which a number of upwardly extending legs 54 are attached, (one leg 54 shown). When lid 28 is closed, the inner surface of the lid bears against the adjacent ends of the legs 54. The lid 28 thus forces the legs 54 and, therefore, retainer ring 53, against filter element top ring 51. The engagement of these components is what holds the filter element 46 in position in housing 22.

Filter element base ring 48 is formed with an outwardly beveled surface 55 around the outer perimeter of the bottom of the ring. Retainer ring 53 is formed with a similar beveled surface 56. First and second 0-rings 57 seat in the spaces adjacent the beveled ring surfaces 55 and 56. Thus, one of the O-rings 57 provides a liquid-tight seal between the filter element base ring 48 and the adjacent inner wall of the housing 22. The second O-ring 57 provides a liquid-tight seal between the retainer ring 53 and the housing 22 at the top of the filter element 46.

An inlet fitting 58 is connected to housing 22 and opens into the housing above retainer ring 53. An outlet fitting 60 is connected to the housing 22 and extends from an opening located above where the filter element base ring 48 is located. When filter assembly 20 is in operation, the process stream is introduced into the housing 22 and the center of the filter element 46 through inlet fitting 58, as represented by arrow 59. The filtrate is trapped by the filter member 50. The filtered process stream exits the filter assembly 20 through the outlet fitting 60, as represented by arrow 61.

Internal to the filter element 46 is a cleaning head assembly 62 for removing trapped filtrate off the filter member 50. The cleaning head assembly 62 includes a generally disk shaped cleaning head 64 that moves up and down through the filter element 46. A number of cleaning blades 66 are attached to the cleaning head around the outer perimeter of the head. The cleaning blades 66 abut the adjacent inner surface of the filter member 50 to scrape the trapped filtrate off the filter member. The cleaning head 64 is slidably mounted over an actuator tube 68 that extends longitudinally axially through the housing 22 and the filter element 46. A pneumatically actuated piston 70 is disposed inside the actuator tube 68. Cleaning head 64 is magnetically coupled to piston 70. Thus, the longitudinal displacement of the piston 70 in the actuator tube 68 results in the like longitudinal movement of the cleaning head 64 through the housing and against the filter member 50.

With this basic understanding, the cleaning head assembly of this invention is now described by initial reference to FIGS. 2, 4 and 5. Actuator tube 68 is formed of a metal that will not react with the contents of the process stream and that is non-magnetic, has a high magnetic permeability and low, preferably zero, magnetic susceptibility. One such material from which actuator tube 68 may be formed is 316 stainless steel.

Figure 6:
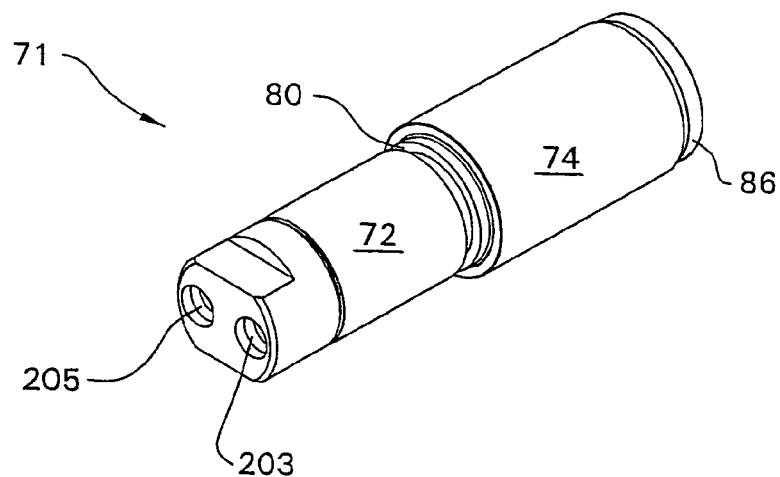
FIG. 6 is a perspective view of the actuator tube bottom cap.

The actuator tube 68 extends upwardly from a solid, generally cylindrical, bottom cap 71 that is fixedly secured to the bottom cone 40. Bottom cap 71, now described by reference to FIGS. 5 and 6, is formed of the same material from which the actuator tube 68 is formed. The bottom cap 71 is shaped to have a relatively narrow diameter stem section 72. A wide diameter head 74 extends coaxially with the stem section 72 and is a single piece with the stem section. Two bores 76 and 77 extend longitudinally through the bottom cap 71. A first bore, bore 76 in FIG. 6, extends to an opening centered around the longitudinal axis of the bottom cap 71 on the top of the head 74 (bore opening not identified). The second bore, bore 77 extends to an opening in the top of the head that is offset from the center axis (bore opening not identified).

The bottom cap stem section 72 is welded or otherwise secured in a bore 75 formed in bottom cone boss 45. More particularly, the bottom cap 71 is fitted to the boss 45 so that the bottom cap and, therefore, the actuator tube 68, extend longitudinally axially through the bottom cone 40 and the housing 22. An O-ring 79 seated in a groove 80 in the bottom cap stem section 72 provides a liquid-tight seal between the bottom cap and the adjacent inner wall of the boss 45. The end of bottom cap stem section 72 extends a short distance beyond the outer surface of the bottom cone 40.

Actuator tube 68 is welded or otherwise secured to the bottom cap head 74. In order to facilitate the mating of the actuator tube 68 to the bottom cap, the bottom cap 71 is formed with a small, reduced diameter recess 86 around the outer perimeter of the head 74. The end of the actuator tube 68 seats in the recess 86.

Returning to FIG. 5, it can be seen that an air tube 90 extends longitudinally axially through actuator tube 68. One end of air tube 90 is mounted in the bottom cap head opening to which bore 76 extends. Air tube 90 is formed from the same material from which the actuator tube 68 is formed.

An end cap 92 covers the open ends of the actuator tube 68 and air tube 90. End cap 92, which is generally frusto-conical in shape, is formed from the same material from which the actuator tube 68 is formed. The outer perimeter of the end cap 92 is formed with a recess (not identified) in which the adjacent end of the actuator tube 68 nests. The end cap 92 is also formed with a closed-end inlet bore 96 that extends upwardly from the base of the cap and that extends along the longitudinal axis of the cap. When the filter assembly 20 of this invention is assembled, air tube 90 opens into the end cap inlet bore 96.

End cap 92 is further formed to have at least one outlet bore 98 (two shown) that extends from the base of the inlet bore 96. The outlet bore 98 extends diagonally away from the inlet bore 96. Outlet bore 98 thus opens into a portion of the base of the end cap 92 that subtends the annular space defined by the inner wall of actuator tube 68 and the outer wall of air tube 90. Thus, bores 96 and 98 provide a fluid flow path from the air tube 90 into the top of the actuator tube 68.

Figure 7:
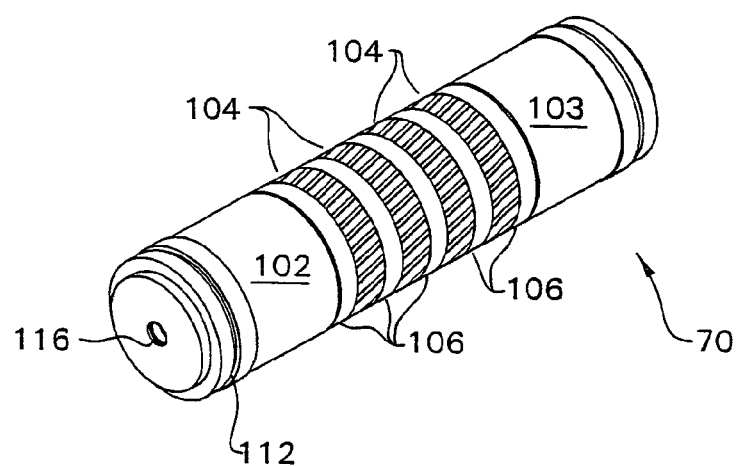
FIG. 7 is a perspective view of the piston.
Figure 8:
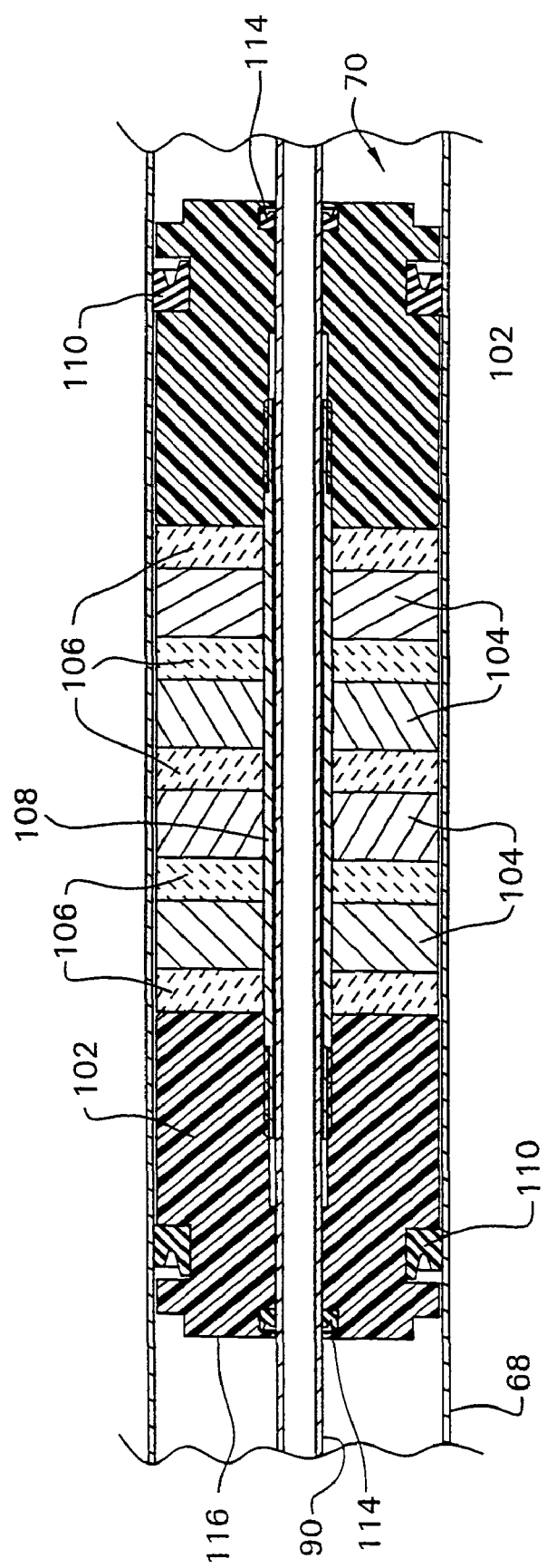
FIG. 8 is a cross-sectional view of the piston wherein the piston is shown disposed over the air tube and encased within the actuator tube.

Piston 70, as seen in FIGS. 7 and 8, is formed to have two opposed cylindrically shaped end caps 102 made of plastic. One specific plastic from which end caps 102 can be manufactured is polyethyleneterphtalate plastic with solid lubricant sold under the trademark ERTALYTE TX by Quadrant Engineering Plastic Products of Tielt, Belgium and Reading, Pennsylvania Sandwiched between end caps 102 are four ring-shaped magnets 104 and five ring-shaped 106 spacers formed of a non-magnetic material such as a ceramic. More specifically, there is a spacer 106 located between each pair of magnets 104. There is also a spacer 106 located between each end cap 102 and the magnet 104 adjacent the end cap.

Figure 9:
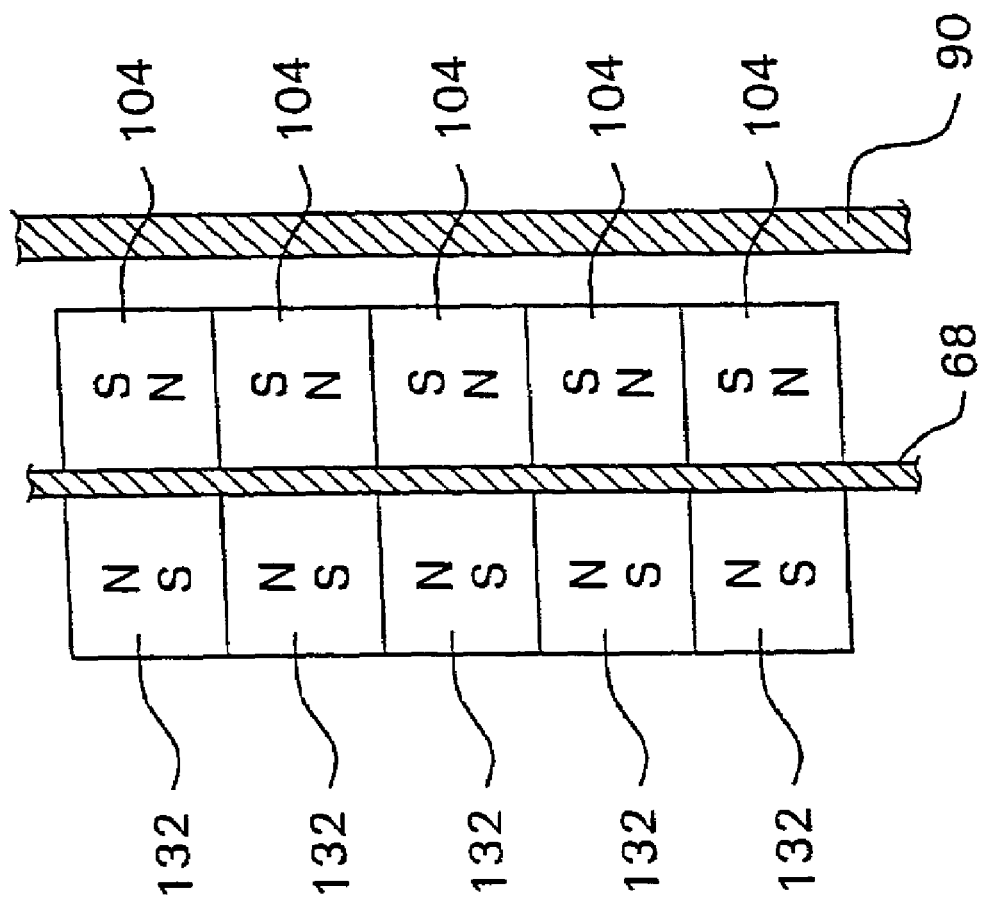
FIG. 9 is a diagrammatic illustration of how the magnets integral with the piston and carrier assembly are arranged according to the polarities of the magnets, the spacers between the magnets as well as the tubing of the carrier assembly are not illustrated. Also, the illustration only depicts the magnets on one side of the piston and carrier assembly, the arrangement on the second side is understood to mirror the illustrated arrangement.

As seen in FIG. 9, magnets 104 are arranged so that faces of adjacent magnets are of the same polarity.

A tube-shaped tie rod 108 formed of brass holds the end caps 102, magnets 104 and spacers 106 together. Tie rod 108 extends through the center openings of magnets 104 and spacers 106 (center opening of magnets and spacers not identified). One end of the tie rod 108 engages threading formed in the bore that extends through one of the end caps 102. The second end of the tie rod 108 engages threading formed in the bore that extends through the second end cap 102. The interior diameter of the tie rod 108 is approximately 0.010 inches greater than that of the enclosed air tube 90.

The end caps 102 are dimensioned to closely fit in the annular space between the actuator tube 68 and air tube 90. The end caps 102 thus function as the bearing elements of the piston 70. Lip seals 110 are seated in grooves 112 formed along the outer perimeter of the end caps 102. One seal 110 is fitted to each end cap 102. The lip seals 110 thus function as the seal members between the piston 70 and the adjacent inner wall of the actuator tube 68. An O-ring 114 seats in a counterbore 116 around the open end of each bore that extends through each end cap 102. The O-rings 114 function as the seals between the piston 70 and the air tube 90.

Magnets 104 and spacers 106 are dimensioned to have diameters that are slightly less than the interior diameter of the surrounding actuator tube 68. In one version of the invention, these components are dimensioned so that the width of the annular gap between the actuator tube 68 and the magnets 104 and spacers 106 is approximately 0.015 inches. This separation prevents the magnets and spacers from galling the interior of the actuator tube 68.

Figure 11:
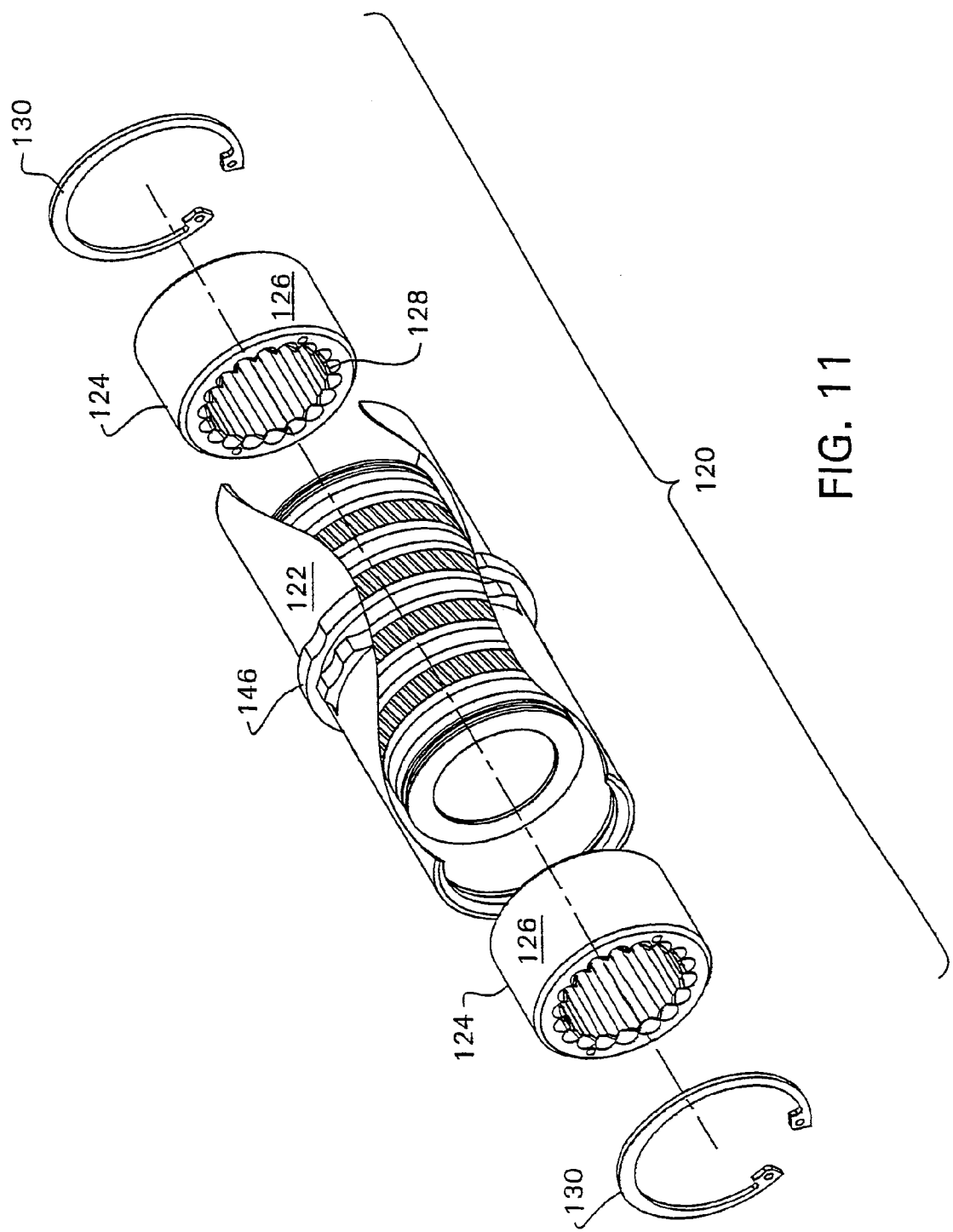
FIG. 11 is an exploded view of the carrier.
Figure 12:
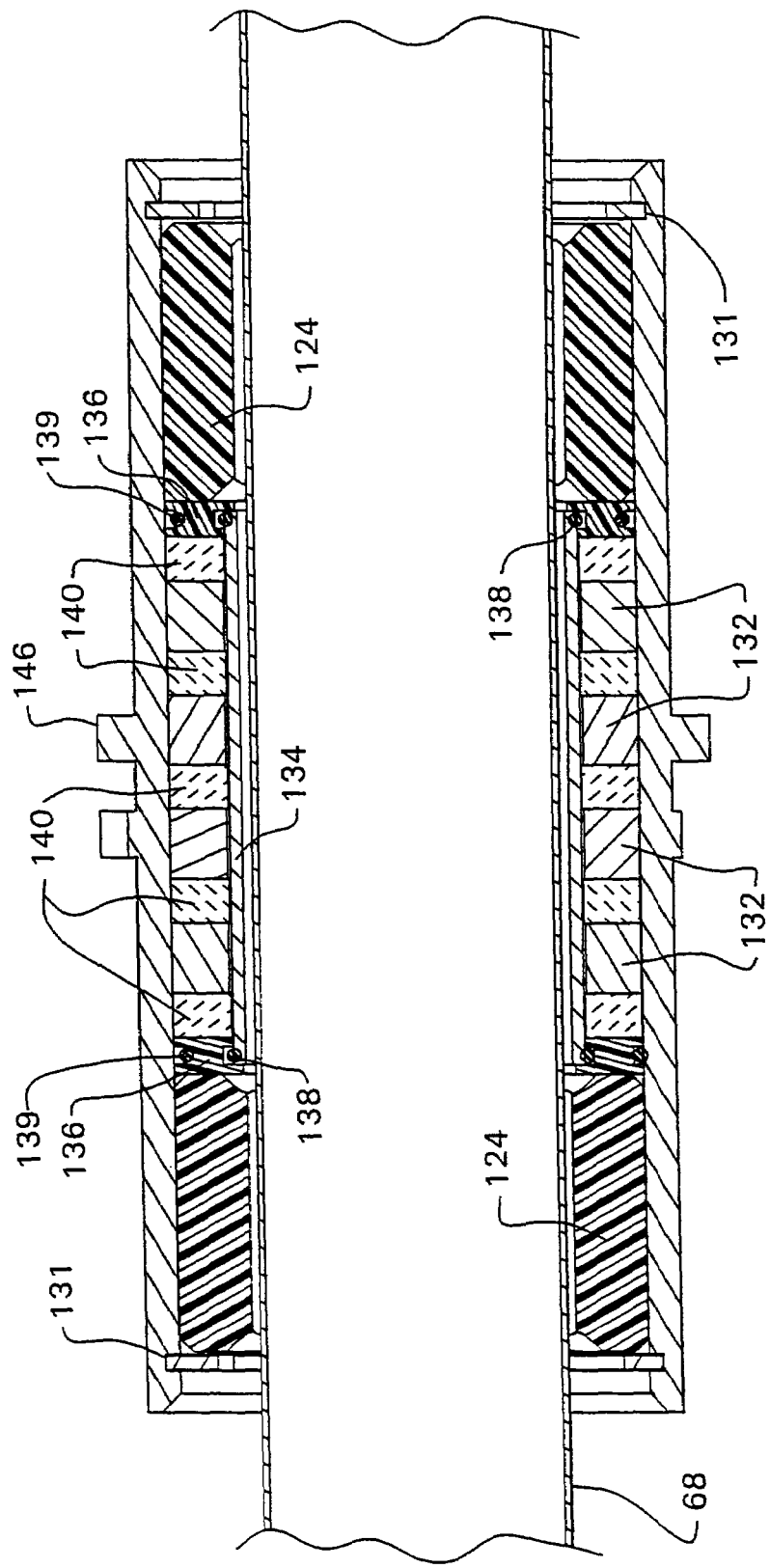
FIG. 12 is a cross-sectional view of the carrier wherein the carrier is shown disposed over the actuator tube.
Figure 13:
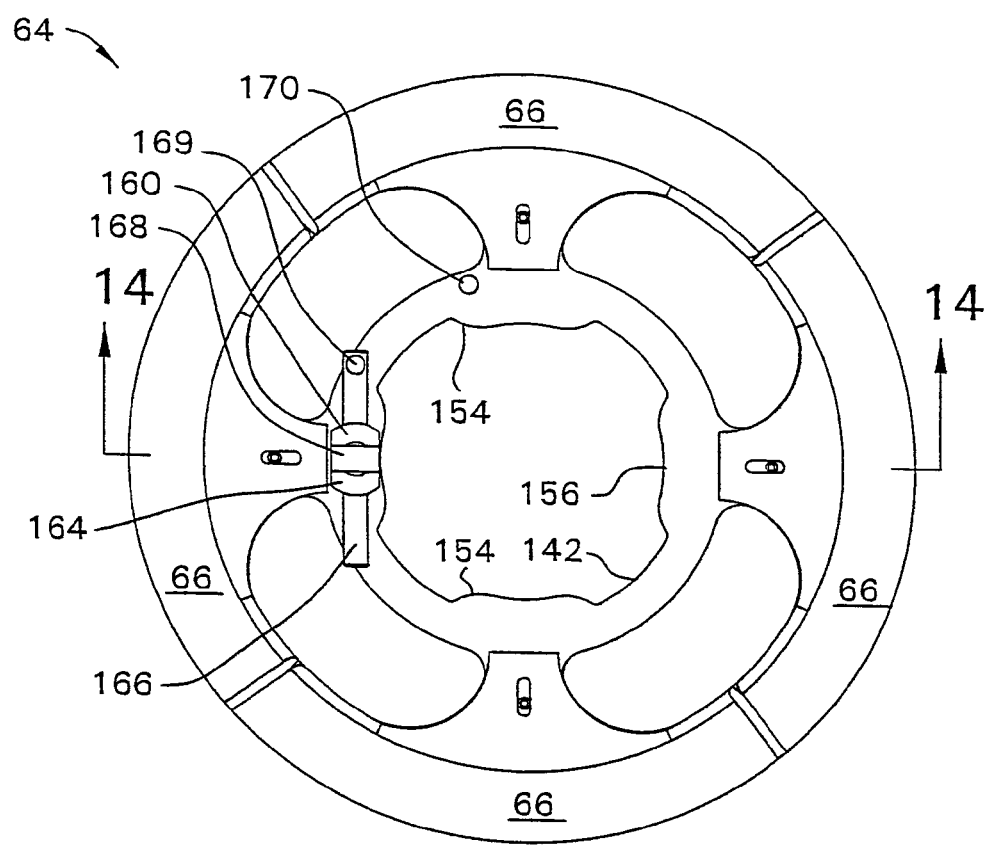
FIG. 13 is a top plane view of the cleaning head.
Figure 14:
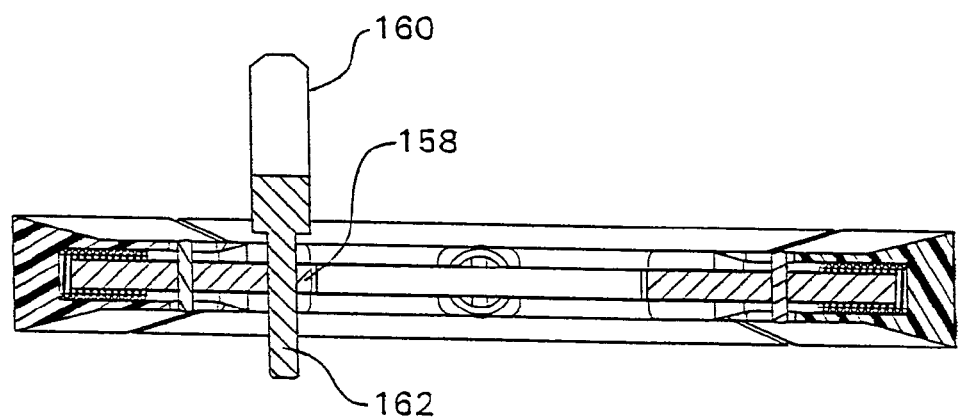
FIG. 14 is a cross-sectional view of the cleaning head taken along line 14—14 of FIG. 13.

A generally sleeve-shaped carrier assembly 120, now described by reference to FIGS. 10, 11 and 12, magnetically couples the cleaning head 64 to piston 70. The carrier assembly 120 is slidably disposed over the actuator tube 68 and has an elongated outer tube 122 formed from the same material from which actuator tube 68 is formed.

Disposed inside the opposed ends of the outer tube 122 are sleeve shaped bearings 124 formed of low friction plastic such as the Ertalyte TX plastic. Each bearing 124 has a smooth surfaced outer wall 126 that abuts the adjacent inner surface of outer tube 122. The inner end of each bearing 124 is formed to have a number of inwardly directed, arcuately spaced apart teeth 128 that are arranged in a circumferential pattern. The inner surfaces of teeth 128 are the surfaces of carrier assembly 120 that actually physically abut the outer surface of actuator tube 68. Snap rings 130 disposed in grooves 131 formed in the inner surface of the outer tube 122 hold bearings 124, as well as the other components internal to the outer tube, in the outer tube.

Four magnets 132 are disposed in outer tube 122 between the outer tube 122 and an inner tube 134 located within the outer tube 122. Inner tube 134 extends between the opposed, inwardly directed faces of bearings 124. Ring shaped carrier retainers 136 formed of Ertalyte TX plastic are seated in the annular space around the opposed outside ends of the inner tube 134. Each carrier retainer 136 extends from the outer surface of the adjacent inner tube end to the inner surface of the surrounding outer tube 122. O-rings 138 and 139 are mounted in grooves formed, respectively, in the outer and inner surfaces of each carrier retainer 136. O-ring 138 forms a seal between the associated carrier retainer 136 and the adjacent outer surface of inner tube 134. O-ring 139 forms a seal between the associated carrier retainer 136 and the adjacent inner surface of outer tube 122.

The magnets 132 are disposed in the enclosed annular space defined by outer and inner tubes 122 and 134, respectively, and carrier retainers 136. Ring-shaped spacers 140 separate adjacent magnets 132. One spacer 140 is also located between each carrier retainer 136 and the adjacent magnet 132.

As seen by the diametric representation of FIG. 9, magnets 132 are arranged so that the faces of the same polarity are adjacent each other. Magnets 104 and 132 are collectively arranged so that when the carrier assembly 120 is fitted over the actuator tube 68 and piston 70, the faces of each magnet 132 are of opposite polarity than the coplanar faces of the corresponding coplanar magnet 104.

The components of this filter assembly 20 of this invention are assembled so that inner tube 134 of carrier assembly 120 has a diameter that is approximately 0.125 inches greater than the diameter of the enclosed actuator tube 68. Thus, the only components of the carrier assembly 120 that abut the actuator tube 68 are the teeth 128 of the bearings 124. Thus, when the filter assembly 20 is in operation, the process stream is able to flow through the interstitial gaps between the bearing teeth 128 at one end of the carrier assembly 120, through the annular gap between the actuator tube 68 and inner tube 134 and out through the interstitial gaps between the bearing teeth 128 at the opposed end of the carrier assembly 120. This arrangement prevents components of the process stream, such as solids that would otherwise be caught by filter member 50, from being trapped between the actuator tube 68 and the carrier assembly 120. If material was allowed to be trapped between the actuator tube 68 and the carrier assembly 120, one or both of the components could be damaged.

The cleaning head 64, as best seen in FIGS. 13, 14, 15 and 16, is in the form of a flat disk. The cleaning head 64 is shaped to have an inner ring 142 and an outer ring 143. Four equangularly spaced apart webs 144 connect the inner and outer rings 142 and 143, respectively, together. The openings in the head 64 between rings 142 and 143 and webs 144 allow the process fluid to flow through the head.

Figure 10:
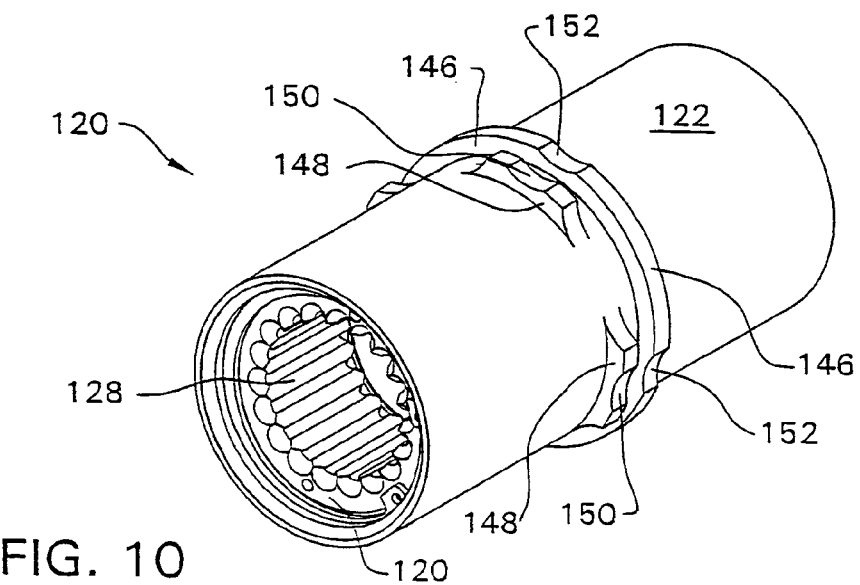
FIG. 10 is a perspective view of the carrier.

The cleaning head 64 is seated between a lip 146 and a set of equangularly spaced apart keys 148 that extend circumferentially around the carrier assembly outer tube 122, as seen best in FIG. 10. Both the lip 146 and keys 148 are formed integrally with the outer tube 122. The lip 146 extends continuously around the outer tube 122 adjacent the mid-section of the tube. Keys 148 are located a small distance, the thickness of cleaning head 64, above lip 146. The outer perimeter of the center of each key 148 is formed to have a small circularly shaped groove 150. The outer perimeter of lip 146 is formed is formed to have four spaced apart grooves 152. Each groove 152 is aligned with a separate one of the key grooves 150.

Returning to FIGS. 13 and 15, it is seen that cleaning head inner ring 142 is formed with a set of inwardly directed angularly spaced apart tabs 154. Collectively, cleaning head 64 and outer tube 122 are dimensioned so that the cleaning head tabs 154 can slide over the tube 122 in the spaces adjacent the tube keys 148. Tabs 154 are further dimensioned so as to have inner edges 156 that are dimensioned to facilitate the close slip fitting of the cleaning head 64 of the carrier assembly outer tube 122.

The cleaning head 64 is releasably mounted to the carrier assembly 120 by slip-fitting the head over outer tube 122. Movement of the cleaning head 64 is stopped by the abutment of tabs 154 against outer tube lip 146. The cleaning head 64 is then rotated so that tabs 154 seat in the annular gaps between the lip 146 and keys 148 of the outer tube 122. More particularly, the cleaning head is rotated until an opening 158 formed in the inner ring 142 goes into registration with the key and lip grooves 150 and 152, respectively, of the carrier assembly 120. A lock pin 160 is seated in opening 158. The lock pin 160 has a stem 162 that extends through opening 158 and seats in the key and lip grooves 150 and 152, respectively. The lock pin 160 thus holds the cleaning head 64 to the carrier assembly 120.

Lock pin 160 is further formed to have a head 164 that has a larger diameter and is coaxial with stem 162. Head 164 thus prevents the lock pin 160 from passing fully through opening 158. Trunions 166 extend perpendicularly from the base of the head 164. A small wire cable (not illustrated) extends from one of the trunions 166 to the cleaning head 164 to hold the lock pin 160 to the cleaning head. The opposed ends of the wire, which are looped, extend around openings 169 and 170 formed, respectively, in one of the trunions 166 and the cleaning head inner ring 142.

In the depicted version of the invention, lock pin 160 is further formed so a slot 168 extends longitudinally partially through the head 164 from the top of the head. The top of the head 164 has an inwardly beveled profile. Providing the head with these features makes it possible to use the lock pin 160 as a tool for removing the cleaning blades 66 from the cleaning head 64.

Each cleaning blade 66, now described by reference to FIGS. 15, 17, 18 and 19, is formed from a single piece of moldable plastic. One suitable plastic is an acetyl resin plastic sold by du Pont under the trademark DELRIN. The cleaning blade 66 is formed to have an arcuately shaped base 172. Base 172 defines the curved outer face 174 of the blade 66 that is disposed against the filter member 50. The side of base 172 opposite that of outer face 174 is formed to have a groove 176 that extends the length of the base. When the cleaning blade 66 is mounted to the cleaning head 64, a section of the head outer ring 143 seats in groove 176.

The cleaning blade base 172 is further formed to have opposed, substantially identically shaped, top and bottom faces 178 and 180, respectively, that extend inwardly from outer face 174. Base 172 is formed so that, relative to the top and bottom edges of the outer face 174, the top and bottom faces 178 and 180, respectively, are inwardly angled. The edges defined by the interfaces of outer face 174 to the top face 178 and the bottom face 180 are the edge surfaces that scrape trapped filtrate off the filter member 50.

Cleaning blade base 172 is further formed to have opposed end faces 181 and 182. Each end face 181 extends from the top face 178 to the bottom face 180 at one end the base. The base 172 is formed so that the end faces 181 and 182 are at an obtuse, non-perpendicular angle to the parallel planes of the top and bottom edge surfaces of the base. The angles of faces 181 and 182 relative to the base edge surfaces are identical.

Each cleaning blade 66 is further formed to have two overlapping legs 183. The legs 183 extend inwardly from the inner face of the base 172, on opposed sides of groove 176 towards the center of the cleaning head 64. Each leg 183 generally has the profile of one of the head webs 144. When each cleaning blade 66 is mounted to the head, the opposed blade legs 183 extend over and under an associated one of the webs 144.

Figure 16:
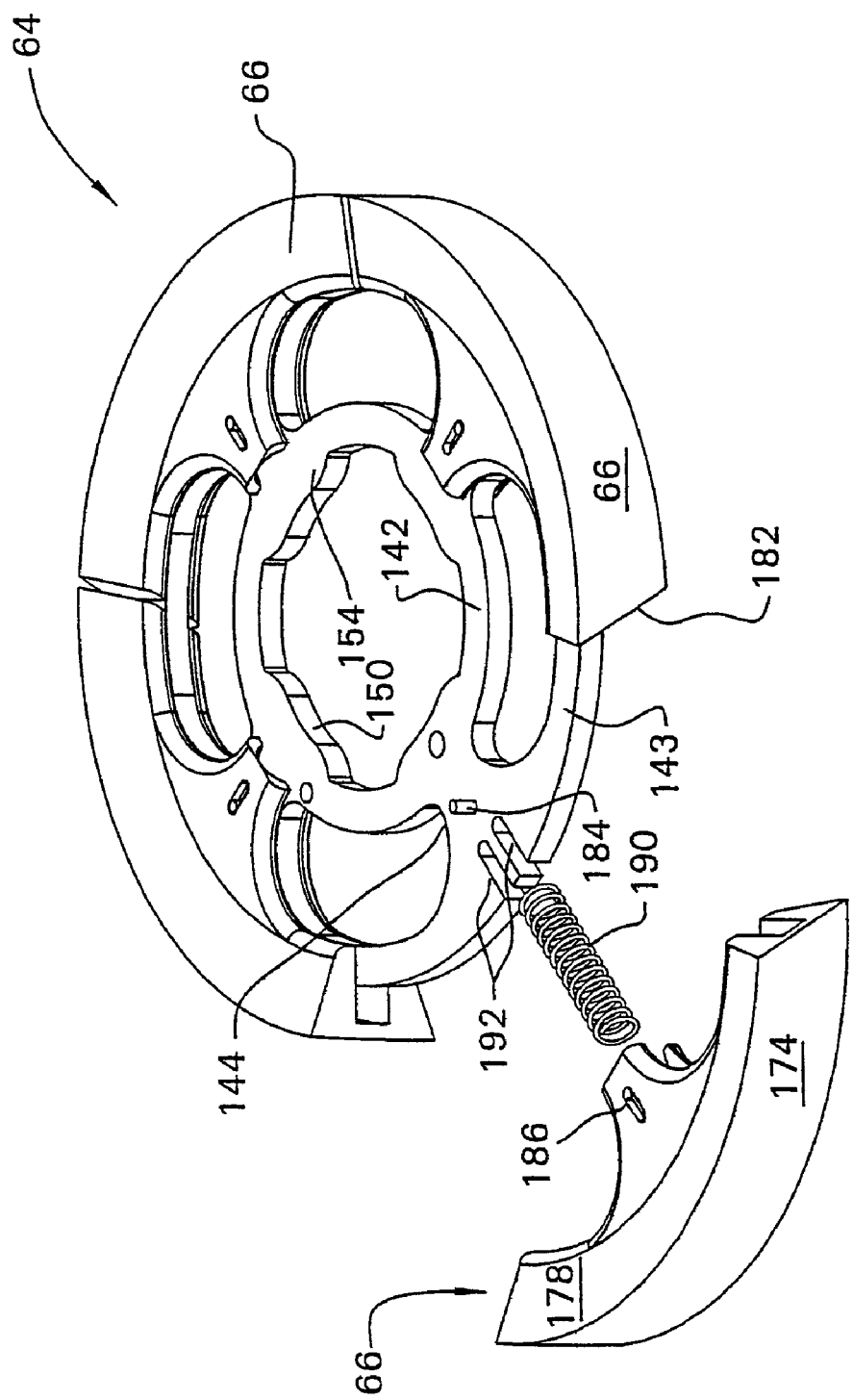
FIG. 16 is a partially exploded view of the cleaning head.
Figure 17:
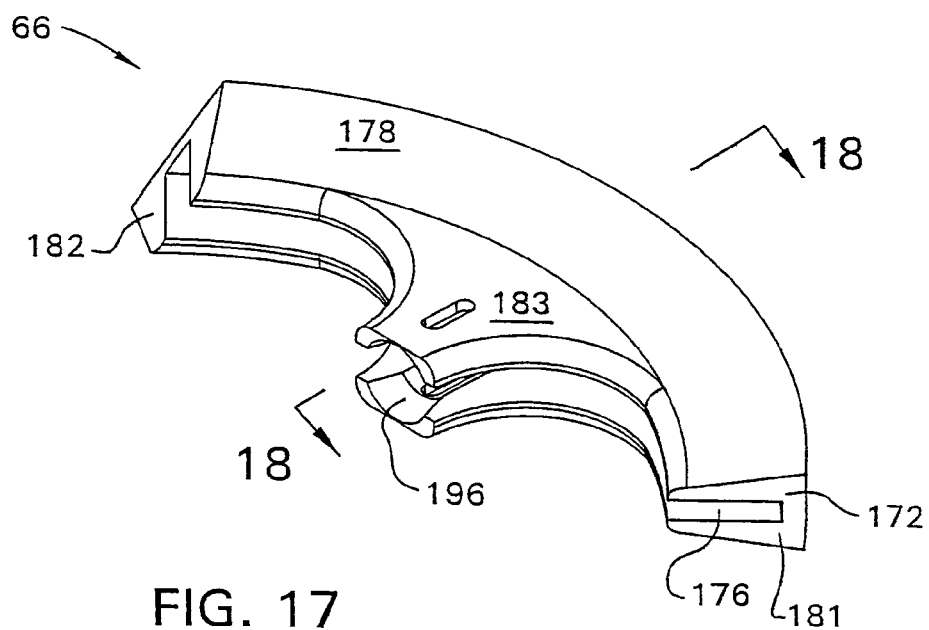
FIG. 17 is a perspective view of the cleaning blade.
Figure 18:
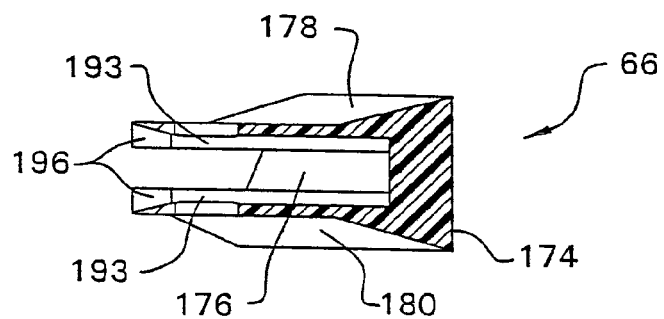
FIG. 18 is a cross-sectional view of the cleaning blade taken along line 18—18 of FIG. 17.
Figure 19:
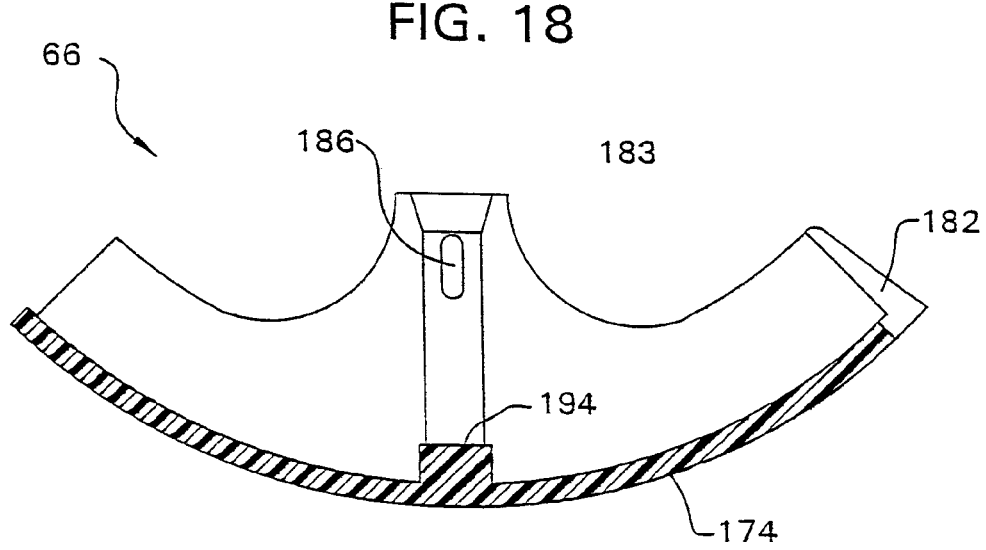
FIG. 19 is a longitudinal cross-sectional view of the cleaning blade.

Pins 184, one seen best in FIG. 16, that extend laterally through the opposed sides of each web 144, hold the cleaning blades 66 to the cleaning head 64. Each leg 183 is formed with an elongated slot 186. When a cleaning blade 66 is fitted to the head, the legs 183 are sufficiently flexible to outwardly bend as the legs move over the associated pin 184. When the pin 184 goes into registration with the associated leg slot 186, the legs 183 snap back down over the enclosed web 144 so as to result in the seating of the pin in the slot.

A coil spring 190 outwardly biases each cleaning blade 66 relative to the cleaning head 64. One end of each spring 190 is seated in parallel opposed slots 192 that extend inwardly from the outer perimeter of the cleaning head outer ring 143. More particularly, the slots 192 forming each slot pair are parallel with and located on opposed sides of the longitudinal axis of a separate one of the head webs 144.

Each spring 190 thus is located between the legs 183 of the cleaning blade 66 with which the spring is associated. In order to facilitate the seating of the spring between the legs, the opposed inner faces of the legs 183 are formed with inwardly directed curved grooves 193. The outer end of each spring 190 abuts a spring pad 194 integral with the base 172 of the associated cleaning blade 66. The spring pad 194 thus extends into the base of the blade groove 176.

The opposed inner surfaces of the cleaning blade leg 183 are formed with tapers 196 adjacent the ends of the legs. The tapers facilitate the snap-fitting of the legs over the associated cleaning head pin 184. The tapers 196 also define spaces between the cleaning head 64 and cleaning blade legs 183 in which the beveled and slotted head 164 of lock pin 160 can be wedged between the legs and the cleaning head. This allows lock pin 160 to be used as a tool for flexing the legs 183 to facilitate the removal of the cleaning blade 66 from the cleaning head 64.

Returning to FIG. 1, it is seen that two air lines 202 and 204 are connected to the exposed end of bottom cap 71. Air line 202 is connected to cap bore 76 through a counter bore 203. Air line 204 is connected to cap bore 77 through a counter bore 205. The opposed ends of air lines 202 and 204 are connected to a common manifold 206. Also connected to the manifold 206 is a source of compressed air 208 and a vent to atmosphere 210. A manifold piston (not illustrated) establishes the connection between the air lines 202 and 204 and the air source 208 and vent 210. Specifically, when the manifold piston is in a first setting, air line 202 is connected to air source 208 and air line 204 is connected to the vent 210. When the manifold piston is in a second position, air line 202 is connected to the vent 210 and air line 204 is connected to the air source 208.

The position of the manifold piston is controlled by a solenoid 212. The actuation of solenoid 212 is controlled by a filter controller 214.

The filter assembly 20 of this invention is used to filter liquid state process streams. The process stream enters the filter assembly 20, and the center of the filter element 46, through inlet fitting 58. The process stream, it should be understood, flows through the openings formed in the cleaning head 64. Material in the process stream, larger in size than pores of the filter member 50, are trapped by the filter member. The filtered process stream is discharged from the filter assembly 20 through the outlet fitting 60.

Over time, a cake of filtered material accumulates on the inner surface of the filter member 50. Periodically, the cleaning head assembly 62 is actuated to scrap this material off the filter member 50. The cleaning head assembly 62 is actuated by energizing the solenoid 212 to change the position of the piston internal to manifold 206.

For example, if the cleaning head 64 is located adjacent the bottom of the actuator tube 68, the manifold piston is set so that air line 202 is connected to the air source 208. Air line 204 and, by extension, bore 77, is vented to atmosphere. When the cleaning head 64 is in this state, the position of the manifold piston is reset to connect air line 202 and, by extension, bore 76, to the vent 210. The resetting of the manifold piston also connects air line 204, and therefore bore 77, to the air supply.

The above-described resetting of the manifold piston thus results in pressurized air from the air supply 208 flowing through air line 204 and bore 77 into the bottom end of the actuator tube 68, below piston 70. At this time, the space above piston 70 in the actuator tube 68 is vented to atmosphere. Consequently, the force of the pressurized air urges the piston 70 upwardly through the actuator tube 68. In some versions of this invention, it is believed necessary to supply air at a pressure of 60 psi into the actuator tube 68 in order to cause the desired displacement of the piston 70. Since the carrier assembly 120 and, by extension, the cleaning head 64, are magnetically coupled to piston 70, these components engage in a like upward motion. The upward movement of the cleaning head 64 causes the cleaning blades 66 to scrape against the filter member 50 so as to remove the filtrate trapped on the member.

The removed filtrate is periodically removed from the filter assembly 20 by directing a purge flow through the assembly. During the purge flow, the filtrate is flushed into the bottom cone 40 and out through the cone outlet fitting 39. The shape of the bottom cone 40 ensures that the purging liquid flows throughout the whole of the interior space of the bottom cone. The flowing of the purge fluid in this pattern substantially eliminates the possibility that filtrate will become trapped and adhere to the interior surfaces of the bottom cone 40.

Once the piston 70, and therefore the cleaning head 64, reach the top of the actuator tube 68, the continued application of the compressed air to the space in the actuator tube 68 below the piston 70 holds the piston in position. The cleaning head 64 is lowered by reversing the position of the manifold piston. This action connects the space in the actuator tube 68 below piston 70 to atmosphere through cap bore 77, air line 204 and vent 210. Simultaneously, pressurized air is flowed from supply 208, air line 202, cap bore 76, air tube 90 and end cap bores 96 and 98 into the top of actuator tube 68 above piston 70. This pressurized air forces piston 70 and, therefore, the cleaning head 64 and cleaning blades 66, downwardly.

The downward movement of the cleaning head 64 also causes the cleaning blades 66 to move against filter member 50 so as to scrape the trapped filtrate off the member.

One of the primary actuated moving components of the filter assembly 20 of this invention, piston 70, is contained within the sealed actuator tube 68. The second actuated component, the cleaning head 64, is magnetically coupled to the piston 70. Therefore, the filter assembly of this invention does not require a seal between the cleaning head 64 and the components that actuate the cleaning head so as to prevent these latter components from coming into contact with the process stream. Since the filter assembly does require this type of seal, the maintenance tasks associated with maintaining it are likewise eliminated.

Figure 15:
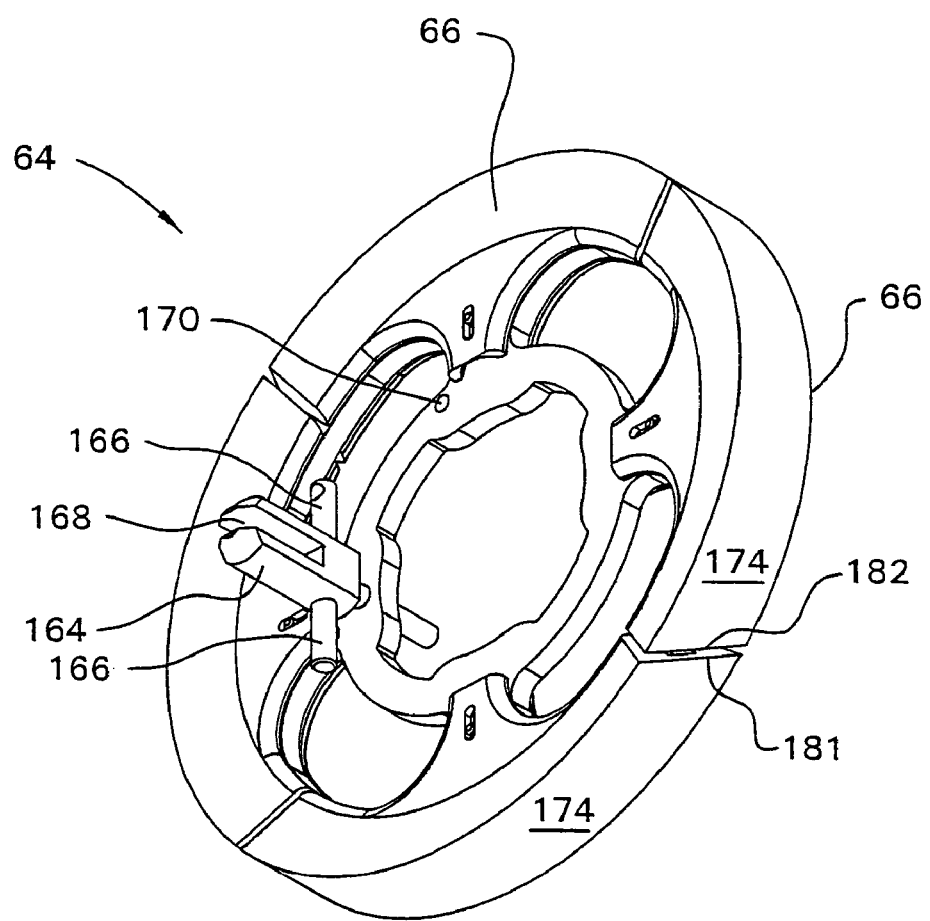
FIG. 15 is a perspective view of the cleaning head.

The cleaning blades 66 are constructed so that the blade end faces 181 and 182 are at obtuse, non-perpendicular, angles to the longitudinal axes of the blades. As depicted in FIG. 15, this construction ensures the gaps around the circumference of the cleaning head 64 and, by extension, the filter member 50, that are not covered by an edge surface of one of the cleaning blades will be covered by an edge surface of an adjacent blade. Thus, as the blades 66 wear, there will still be a blade edge surface pressing against each circumferential section of the filter member 50 so as to scrape filtrate off the whole of the member.

Spring 190 ensures that, as the base 172 of the cleaning blade 66 with which the spring is associated wears, the edge surfaces of the blade continue to press against the filter member 50.

The spring pad 194 of a cleaning blade 66 performs two functions. The spring pad 194 serves as a surface against which the associated spring 190 bears. The spring pad 194 also serves as a pad that holds the portions of the base inward of the section that defines outer face 174 and the base of groove 176 together. This function is desirable because, over time, the pressing of the blade base 172 against the filter member 50 causes this outer perimeter section of the base to wear away. Eventually the material forming this section of the cleaning blade 66 can wear through to groove 176. When this occurs, spring pad 194 holds the remaining portions of the base, the portions that define the inward sections of the base bottom and top edges 178 and 180, respectively, together. Thus, spring pad 194 prevents the portions of the cleaning blade from separating while in the filter assembly 20.

It should be understood that the foregoing description is limited to one specific version of this invention. Other versions of this invention may have features that are different from what has been described.

For instance, it may be desirable to mount magnetic field sensors 218 and 220 to the filter housing 22. One sensor, sensor 218 in FIG. 2, is mounted to the filter housing 22 so as to be aligned with the lowest longitudinal positions of the piston 70 and the carrier assembly 120. Sensor 220 is mounted to the filter housing 22 so as to be aligned with the highest longitudinal positions of the piston 70 and the carrier assembly 120. Sensors 218 and 220 may be Hall effect sensors or magnetically actuated switches like reed switches. Each sensor 218 and 220 is encased in its own bubble 222 that is magnetically shielded from the ambient environment.

The sensors 218 and 220 are thus sensitive to the magnetic fields generated by piston magnets 104 and carrier assembly magnets 132. Sensors 218 and 220 thus, respectively, generate signals indicating when the cleaning head 64 is in, respectively, the lowest and highest position in the filter member. These signals can be used to monitor whether or not the filter assembly of this invention is functioning properly. The signals generated by sensors 218 and 220 can also be applied to filter controller 214. Filter controller 214, based on the cleaning head position information provided by the sensor signals, can then selectively control the energization of the solenoid 212 so as to regulate the setting of the manifold piston.

It should further be recognized that alternative means may be used to drive the piston 70 up and down in the actuator tube 68. For example, it may be desirable to connect a set of electrically actuated valves to air lines 202 and 204. By selective setting of the valves, each air line can be connected to the source of compressed air, a vent to atmosphere or sealed closed. Thus, after the pressurized air is used to place the piston 70, and by extension, in an elevated position, air line 204 could be closed. This would leave a charge of pressurized air in air line 204, cap bore 77 and the actuator tube 68 that would hold the piston 70 in the elevated state. This would eliminate the need to continually supply pressurized air to perform this function.

It is also further apparent that in not all versions of the invention that are fluid driven, is the flow tube to the top of the actuator tube located within the actuator tube. In some versions of this invention this tube, air tube 90 in the described version of the invention, may be located external to the actuator tube 68. This tube may not even be attached to the outside of the actuator tube 68; the tube could be a stand alone tube in the filter housing 22.

Also, in not all versions of this invention is it necessary to use pneumatic fluid to drive piston 70. In some versions of the invention, hydraulic fluid may be employed to perform this function. It should further be recognized that it may not be necessary in all versions of this invention to employ fluids to drive piston 70 up and down through the actuator tube 68. In alternative versions of this invention the piston, or at least magnets 104, may be driven up and down in the actuator tube 68 by a lead screw that, while static in position, rotates within the actuator tube 68. The mechanism used to drive this lead screw could be similar to that described in U.S. Pat. No. 5,198,111. In still other versions of the invention, the magnets 104 may be at the head of a piston rod that is disposed within the actuator tube 68. A head associated with the piston rod is contained in a piston cylinder external to housing 22 and is pneumatically or hydraulically driven. The particular hydraulic drive assembly could be similar to that described in U.S. Pat. No. 5,527,462.

It should further be understood that the materials from which the described version of the invention are constructed are understood to be illustrative and not limiting.

Still another feature of this invention is that, in some versions of the invention, multiple filter assembly housings 22 may be connected together by tabs 25. In these versions of the invention, the housings 22 support each other. Thus, an array of filter assemblies 20 of this invention can be assembled together without having to provide each assembly with its own support legs.

It also should be recognized that the features of this invention may, when desirable, be practiced indpendently of each other. It is not necessary that all magnetically coupled cleaning head assemblies of this invention employ the illustrated and described cleaning head and cleaning blade sub-assembly. Similarly, the described cleaning head and cleaning blade sub-assembly, can be employed with alternative actuators.

Variations in the described cleaning blades are also possible. For example, in some versions of the invention, it may not be necessary to provide the pair of opposed legs to facilitate the mounting of the cleaning blade to the associated cleaning head. In these versions of the invention, a first member or void space formed on the cleaning blade side surface may engage with or into a complementary second void space or member on the cleaning head. In alternative versions of the invention, each cleaning blade may, on each side, have two or more legs with members or void spaces designed to facilitate the engagement of the cleaning blade with the complementary cleaning head.

Therefore, it is an object of the appended claims to cover all such variations and modifications that come within the true spirit and scope of this invention.

What is claimed is:

1. A filter assembly comprising:
  a housing defining an enclosed space, said housing having an inlet opening into the enclosed space and an outlet opening from the enclosed space;
  a filter element disposed in the enclosed space within said housing, wherein said filter element is positioned in said housing so that a process stream introduced into the enclosed space through said inlet opening flows through said filter element prior to discharge through said outlet opening and said filter element has a surface against which filtrate is trapped as the process stream flows through said filter element;
  a cleaning head disposed in the enclosed space within said housing and having at least one cleaning blade positioned to abut the surface of said filter element;
  a sealed tube within the enclosed space of said housing;
  a first magnet disposed in said sealed tube so as to move within said sealed tube;
  an actuator assembly connected to said sealed tube or said first magnet for selectively moving said first magnet in said sealed tube; and
  a second magnet located in the enclosed space in said housing and located adjacent and external to said sealed tube, said second magnet being magnetically coupled to said first magnet to move along said sealed tube with the movement of said first magnet and being attached to said cleaning head so that said cleaning head moves with said second magnet, wherein:
  said sealed tube has opposed top and bottom ends and said first magnet is disposed in said sealed tube so as to be move between the top and bottom ends;
  an air tube is connected to said sealed tube and opens into the top end of said sealed tube;
  said actuator assembly includes:
    a first air line connected to said sealed tube through which gas can be supplied to the bottom end of said sealed tube;
    a second air line connected to said air tube through which gas can be supplied to said air tube to the top end of said sealed tube;
    a source of compressed gas; and
    a flow control assembly connected at one end to said first and second air lines and, at a second end to said source of compressed gas for directing the flow of compressed gas to said first air line or to said second air line.

2. The filter assembly of claim 1, wherein:
  said air tube is disposed in said sealed tube; and
  said first magnet at least partially surrounds said air tube;

3. The filter assembly of claim 1, wherein:
  said first magnet is formed with a bore; and
  said air tube is disposed in said sealed tube and positioned in said sealed tube so that said air tube extends through the bore in said first magnet.

4. A filter assembly comprising:
  a housing defining an enclosed space, said housing having an inlet opening into the enclosed space and an outlet opening from the enclosed space;
  a filter element disposed in the enclosed space within said housing, wherein said filter element is positioned in said housing so that a process stream introduced into the enclosed space through said inlet opening flows through said filter element prior to discharge through said outlet opening and said filter element has a surface against which filtrate is trapped as the process stream flows through said filter element;
  a cleaning head disposed in the enclosed space within said housing and having at least one cleaning blade positioned to abut the surface of said filter element;
  a sealed tube within the enclosed space of said housing;
  a first magnet disposed in said sealed tube so as to move within said sealed tube;
  an actuator assembly connected to said sealed tube or said first magnet for selectively moving said first magnet in said sealed tube; and
  a second magnet located in the enclosed space in said housing and located adjacent and external to said sealed tube, said second magnet being magnetically coupled to said first magnet to move along said sealed tube with the movement of said first magnet and being attached to said cleaning head so that said cleaning head moves with said second magnet, wherein:
  said filter element surrounds said sealed tube; and said at least one cleaning blade is positioned to abut the whole of the surface of said filter element that surrounds said sealed tube.

5. A filter assembly comprising:
  a housing defining an enclosed space, said housing having an inlet opening into the enclosed space and an outlet opening from the enclosed space;
  a filter element disposed in the enclosed space within said housing, wherein said filter element is positioned in said housing so that a process stream introduced into the enclosed space through said inlet opening flows through said filter element prior to discharge through said outlet opening and said filter element has a surface against which filtrate is trapped as the process stream flows through said filter element;
  a cleaning head disposed in the enclosed space within said housing and having at least one cleaning blade positioned to abut the surface of said filter element;
  a sealed tube within the enclosed space of said housing;
  a first magnet disposed in said sealed tube so as to move within said sealed tube;
  an actuator assembly connected to said sealed tube or said first magnet for selectively moving said first magnet in said sealed tube; and
  a second magnet located in the enclosed space in said housing and located adjacent and external to said sealed tube, said second magnet being magnetically coupled to said first magnet to move along said sealed tube with the movement of said first magnet and being attached to said cleaning head so that said cleaning head moves with said second magnet, wherein:
  said actuator tube has opposed top and bottom ends and said first magnet is disposed in said actuator tube so as to move between the top and bottom ends;
  an air tube is connected to said actuator tube and opens into the top end of said actuator tube;
  said actuator assembly includes:
    a first air line connected to said sealed tube through which air can be supplied to the bottom end of said actuator tube;
    a second air line connected to said air tube through which air can be supplied to said air tube to the top end of said actuator tube;
    a source of compressed gas; and a flow control assembly connected at one end to said first and second air lines and, at a second end to said source of compressed gas for directing the flow of compressed gas to said first air line or to said second air line.

6. The filter assembly of claim 5, wherein:
said air tube is disposed in said actuator tube; and
said first magnet at least partially surrounds said air tube.

7. The filter assembly of claim 5, wherein:
said first magnet is formed with a bore; and
said air tube is disposed in said actuator tube and positioned in said sealed tube so that said air tube extends through the bore in said first magnet.

8. A filter assembly comprising:
a housing defining an enclosed space, said housing having an inlet opening into the enclosed space and an outlet opening from the enclosed space;
a filter element disposed in the enclosed space within said housing, wherein said filter element is positioned in said housing so that a process stream introduced into the enclosed space through said inlet opening flows through said filter element prior to discharge through said outlet opening and said filter element has a surface against which filtrate is trapped as the process stream flows through said filter element;
a cleaning head disposed in the enclosed space within said housing and having at least one cleaning blade positioned to abut the surface of said filter element;
a sealed tube within the enclosed space of said housing;
a first magnet disposed in said sealed tube so as to move within said sealed tube;
an actuator assembly connected to said sealed tube or said first magnet for selectively moving said first magnet in said sealed tube; and
a second magnet located in the enclosed space in said housing and located adjacent and external to said sealed tube, said second magnet being magnetically coupled to said first magnet to move along said sealed tube with the movement of said first magnet and being attached to said cleaning head so that said cleaning head moves with said second magnet, wherein:
said filter element surrounds said actuator tube; and
said at least one cleaning blade positioned to abut the whole of the surface of said filter element that surrounds said actuator tube.

9. A filter assembly, including:
a housing defining an enclosed space, said housing having an inlet opening into the enclosed space and an outlet opening from the enclosed space;
a filter element disposed in the enclosed space within said housing that extends longitudinally in the enclosed space, said filter element being positioned in the enclosed space so that a process stream introduced into the enclosed space through said inlet opening flows through said filter element prior to discharge from said outlet opening and said filter element has a surface against which removed material is trapped as the process stream flows through said filter element;
an actuator tube disposed in the enclosed space in said filter housing and extending longitudinally at least partially through the enclosed space and being located inward of the surface of said filter element against which removed material is trapped, said actuator tube having opposed top and bottom ends that are sealed from the enclosed space;
an air tube disposed in said actuator tube, said air tube having a top end that is open into the top end of said actuator tube;
a piston slidably disposable in said actuator tube between said actuator tube and said air tube, said piston having at least one first magnet;
a tube assembly connected at one end to said source of gas and at a second end to the base of said actuator tube and to said air tube;
a cleaning head located in the enclosed space of said housing between said filter element and said actuator tube, said cleaning head having at least one cleaning blade that is positioned to abut the surface of said filter element against which removed material is trapped and at least one second magnet, said at least one second magnet being located adjacent said actuator tube and being magnetically coupled to said at least one first magnet so that said at least one second magnet causes said cleaning head, including said at least one cleaning blade, to move longitudinally with the longitudinal movement of said at least one first magnet.

10. The filter assembly of claim 9, wherein said piston at least partially surrounds said air tube.

11. The filter assembly of claim 9, wherein:
said actuator tube and said air tube are coaxial; and
said piston, including said at least one first magnet, is formed with a through bore and said piston is disposed in said actuator tube so that said air tube extends through the piston bore.

12. The filter assembly of claim 9, wherein:
an end cap covers the top end of said acutator tube;
said air tube extends into said end cap; and
said end cap is formed with a fluid communication path that extends from a top end of said air tube to the top end of said actuator tube.

13. The filter assembly of claim 9, wherein said air tube assembly includes a first air line that extends from an opening into the base of said actuator tube and a second air line that extends from said air tube.

14. The filter assembly of claim 9, wherein said cleaning head includes a body to which said at least one second magnet is attached and to which said at least one cleaning blade is releasably and moveably attached and said cleaning head includes a biasing member extending between said body and said at least one cleaning blade for urging said at least one cleaning blade outwardly towards said filter element.

15. The filter assembly of claim 9, wherein said cleaning head includes a body to which said at least one second magnet is releasably attached and to which said at least one cleaning blade is attached.

16. The filter assembly of claim 9, wherein said cleaning head includes:
a carrier that is slidably disposed over said actuator tube and said at least one second magnet is disposed in said carrier; and
a body that is releasably secured to said carrier and said at least one cleaning blade is attached to said body.

17. The filter assembly of claim 9, wherein said piston includes a plurality of said first magnets.

18. The filter assembly of claim 9, wherein said cleaning head includes a plurality of said second magnets.

19. The apparatus of claim 9 in which said filter element has a circular cross-sectional profile defining a process stream path through the center thereof and having an inner surface as its surface against which removed material is trapped, and a plurality of said cleaning blades attached to said cleaning head so as to be located between said cleaning head and the inner surface of said filter element, each said cleaning blade having an arcuately shaped base that is positioned to bear against the inner surface of said filter element, the base having opposed parallel top and bottom surfaces and opposed end faces that extend between the top and bottom surfaces, the end faces being at obtuse angles to the top and bottom surfaces and said cleaning blades being arranged coplanar on said cleaning head and so that the end faces of adjacent said cleaning blades overlap.

20. The apparatus of claim 9 in which said cleaning blade has:
a body having an arcuately shaped outer face; opposed top and bottom faces that extend inwardly from the outer face, the outer face and top face defining a top edge; opposed end faces, each end face extends from the top face to the bottom face and being at an obtuse angle to the top edge; and
at least one fastening feature integral with said body that is shaped to engage with a complementary fastening feature on the cleaning head.

21. A filter assembly comprising:
a housing defining an enclosed space, said housing having an inlet opening into the enclosed space and an outlet opening from the enclosed space;
a filter element disposed in the enclosed space within said housing, wherein said filter element is positioned in said housing so that a process stream introduced into the enclosed space through said inlet opening flows through said filter element prior to discharge through said outlet opening and said filter element has a generally cylindrical surface against which removed material is trapped as the process stream flows through said filter element;
a cleaning head disposed in the enclosed space within said housing and having at least one cleaning blade positioned to abut said surface of said filter element;
a sealed tube within the filter element of said housing;
a first magnet disposed in said sealed tube so as to move within said sealed tube;
an actuator assembly connected to said sealed tube or said first magnet for selectively moving said first magnet in said sealed tube; and
a second magnet located in the enclosed space in said housing and located adjacent and external to said sealed tube, said second magnet being magnetically coupled to said first magnet to move along said sealed tube with the movement of said first magnet and being attached to said cleaning head so that said cleaning head moves with said second magnet, wherein said first and second magnets have paths of movement generally parallel to said generally cylindrical filter element surface.

22. The filter assembly of claim 21, wherein said actuator assembly comprises:
a compressed air source; and
an air line connected from said compressed air source to said sealed tube.

23. A filter assembly comprising:
a housing defining an enclosed space, said housing having an inlet opening into the enclosed space and an outlet opening from the enclosed space;
a hollow filter element disposed in the enclosed space with said housing, said filter element being positioned within the enclosed space so that a process stream entering said housing through said outlet opening passes through said filter element prior to being discharged through said outlet opening and said filter element has a surface against which removed material is trapped as the process stream flows through said housing;
an actuator tube that extends longitudinally through the enclosed space of said housing, said actuator tube being located adjacent said surface of said filter element against which removed material is trapped;
a first magnet disposed in said actuator tube and positioned to travel longitudinally through said actuator tube;
an actuator assembly connected to said actuator tube or said first magnet for moving said first magnet longitudinally through said actuator tube; and
a cleaning head disposed in the enclosed space of said housing between said actuator tube and said surface of said filter element against which removed material is trapped, said cleaning head having a second magnet that is magnetically coupled to said first magnet to move in the enclosed space with the first magnet in said actuator tube and a cleaning blade that is connected to said second magnet to move with said second magnet and is positioned to abut against said filter element surface wherein at least one of said magnets is disposed within said hollow filter element.

24. The filter assembly of claim 23, wherein said actuator assembly comprises:
a compressed air source; and
an air line connected from said compressed air source to said actuator tube.

25. The filter assembly of claim 23, wherein said at least one cleaning blade is releasably connected to said second magnet.

26. The filter assembly of claim 23, wherein:
said cleaning head includes a body member that is located between said actuator tube and said filter element;
said second magnet is releasably attached to said body member; and
said at least one cleaning blade is releasably attached to an outer perimeter of said cleaning head body member and is positioned to bear against said filter element.

* * * * *